(12) United States Patent
Guha et al.

(10) Patent No.: US 8,761,175 B2
(45) Date of Patent: Jun. 24, 2014

(54) DISTRIBUTED METHOD FOR MINIMUM DELAY MULTI-HOP DATA DELIVERY IN VEHICULAR NETWORKS

(75) Inventors: Ratul K. Guha, Princeton, NJ (US); Wai Chen, Parsippany, NJ (US); Stephanie Demers, Westfield, NJ (US); Jasmine Chennikara-Varghese, Somerset, NJ (US)

(73) Assignee: TTI Inventions D LLC, Wilmington, DE (US)

( * ) Notice: Subject to any disclaimer, the term of this patent is extended or adjusted under 35 U.S.C. 154(b) by 266 days.

(21) Appl. No.: 12/408,221

(22) Filed: Mar. 20, 2009

(65) Prior Publication Data

US 2009/0238187 A1    Sep. 24, 2009

Related U.S. Application Data

(60) Provisional application No. 61/038,224, filed on Mar. 20, 2008.

(51) Int. Cl.
*H04L 12/28* (2006.01)
*H04J 3/16* (2006.01)
*G06F 15/173* (2006.01)

(52) U.S. Cl.
USPC .......... 370/392; 370/389; 370/465; 340/903; 709/238

(58) Field of Classification Search
USPC .......... 370/229–465; 340/436–463, 902–916; 709/222–241; 701/200–533
See application file for complete search history.

(56) References Cited

U.S. PATENT DOCUMENTS

| | | | | |
|---|---|---|---|---|
| 6,370,475 | B1 * | 4/2002 | Breed et al. | 701/301 |
| 6,532,368 | B1 * | 3/2003 | Hild et al. | 455/515 |
| 6,791,472 | B1 * | 9/2004 | Hoffberg | 340/905 |
| 6,862,524 | B1 * | 3/2005 | Nagda et al. | 701/420 |
| 6,985,089 | B2 * | 1/2006 | Liu et al. | 340/903 |
| 7,098,805 | B2 * | 8/2006 | Meadows et al. | 340/905 |
| 7,251,223 | B1 * | 7/2007 | Barrett et al. | 370/315 |
| 7,281,057 | B2 * | 10/2007 | Cain | 709/238 |
| 7,333,026 | B2 * | 2/2008 | Hunzinger | 340/903 |
| 7,436,789 | B2 * | 10/2008 | Caliskan et al. | 370/310.1 |
| 7,532,130 | B2 * | 5/2009 | Curtis | 340/902 |
| 7,720,060 | B2 * | 5/2010 | Greene et al. | 370/389 |

(Continued)

OTHER PUBLICATIONS

S. Basagni, I. Chlamtac, V. R. Syrotiuk, and B.A. Woodward. A Distance Routing Effect Algorithm for Mobility. In Proceedings of MOBICOM, pp. 76-84, 1998.

(Continued)

*Primary Examiner* — Man Phan

(57) ABSTRACT

An inventive method for data delivery in a multi-hop vehicular network with multiple vehicles and intersections is presented. The method comprises, at each source vehicle, initiating packet flow, labeling packets with destination coordinates and a current location, and forwarding the packet flow, and at each intersection, selecting a header vehicle, computing a backlog indicator and listening for broadcasts with a matrix and delay information, updating the matrix in accordance with the backlog indicator if the matrix is present, otherwise initializing the matrix, forwarding the packet flow, and broadcasting the matrix from the header vehicle. In one embodiment, selection of the header vehicle is performed based on random countdown and vehicle ID. The method converges to the optimal (lowest latency) state irrespective of the initial starting point of the network and continues to tend towards the optimal state even as the network conditions alter.

20 Claims, 5 Drawing Sheets

(56) References Cited

U.S. PATENT DOCUMENTS

| | | | | |
|---|---|---|---|---|
| 8,108,141 | B2* | 1/2012 | Ehrlacher | 701/416 |
| 8,169,897 | B2* | 5/2012 | Guha et al. | 370/229 |
| 8,325,718 | B2* | 12/2012 | Liu et al. | 370/389 |
| 2004/0073361 | A1* | 4/2004 | Tzamaloukas et al. | 701/210 |
| 2007/0115868 | A1* | 5/2007 | Chen et al. | 370/315 |
| 2007/0271079 | A1* | 11/2007 | Oguchi et al. | 703/8 |
| 2008/0015771 | A1* | 1/2008 | Breed et al. | 701/207 |
| 2008/0039113 | A1 | 2/2008 | Liu et al. | |
| 2008/0095134 | A1* | 4/2008 | Chen et al. | 370/342 |
| 2010/0074114 | A1* | 3/2010 | Guha et al. | 370/238 |

OTHER PUBLICATIONS

W. Chen, J. Chennikara-Varghese, and S. Cai. Local peer group organization and architecture for vehicle communications. V2VCOM Workshop, 2005.

C. Lochert et al. A routing strategy for vehicular ad hoc network in the city environments. Proc. of IEEE Intelligent Vehicles Symposium, 2003.

M. Sun et al. Gps-based message broadcast for adaptive inter-vehicle communications. IEEE VTC, 2000.

S. Jain, K. Fall, and R. Patra. Routing in a delay tolerant network. Proc. of SIGCOMM 2004.

B. Karp and H. T. Kung. Gpsr: greedy perimeter stateless routing for wireless networks. Proc. ACM/IEEE MobiCom, 2000.

G. Korkmaz, E. Ekici, and F. Ozguner. A cross-layer multihop data delivery protocol with fairness guarantees for vehicular networks. IEEE Transactions on Vehicular Technology, 55(3), 2006.

G. Korkmaz, E. Ekici, F. Ozguner, and U. Ozguner. Urban multi-hop broadcast protocol for inter-vehicle communication systems. Proc. of VANET, 2004.

T. Kosch, C. Schwingenschlogl, and L. Ai. Information dissemination in multihop inter-vehicle networks—adapting the ad-hoc on-demand distance vector routing protocol (aodv). IEEE ITSC, 2002.

K. C. Lee, J. Haerri, U. Lee, and M. Gerla. Enhanced perimeter routing for geographic routing protocols in urban vehicular scenarios. IEEE Autonet Wworkshop, 2007.

J. Li, J. Jannotti, D.De Couto, D. Karger, and R. Morris. A Scalable Location Service for Geographic Ad Hoc Routing. In Proceedings of IEEE/ACM Mobicom, 2000.

S. Oh, J. Kang, and M. Gruteser. Location-based ooding techniques for vehicular emergency messaging. Proc. of V2VCOM, 2006.

K. Ramachandran, M. Gruteser, R. Onishi, and T. Hikita. Experimental analysis of broadcast reliability in dense vehicular networks. Proc. of IEEE VTC, 2007.

R. T. Rockafellar. Convex Analysis. Princeton Univ. Press, 1972.

J. Tan, L. Han, K. Rothermel, and C. Cseh. Spatially aware packet routing for mobile ad hoc inter-vehicle radio networks. IEEE ITSC, 2003.

L. Wischhof, A. Ebner, H. Rohling, M. Lott, and R. Halfmann. Adaptive broadcast for travel and trafc information distribution based on inter-vehicle communication. IEEE Intelligent Vehicle Symposium, 2003.

H. Wu, R. Fujimoto, R. Guensler, and M. Hunter. Mddv: A mobility-centric data dissemination algorithm for vehicular networks. Proc. of VANET, 2005.

J. Zhao and G. Cao. Vadd: Vehicle-assisted data delivery in vehicular ad hoc networks. Proc. of IEEE Infocom, 2006.

International Search Report dated May 22, 2009.

International Preliminary Report on Patentability for PCT/US09/37788, completed Feb. 16, 2010.

Written Opinion on PCT/US09/37788, mailed May 22, 2009.

Extended European Search Report for EP Application 09723447.0, dated Aug. 12, 2011.

* cited by examiner

DISTRIBUTED METHOD FOR MINIMUM DELAY MULTI-HOP DATA DELIVERY IN VEHICULAR NETWORKS

CROSS REFERENCE TO RELATED APPLICATIONS

The present invention claims the benefit of U.S. provisional patent application 61/038,224 filed Mar. 20, 2008, the entire contents and disclosure of which are incorporated herein by reference as if fully set forth herein.

FIELD OF THE INVENTION

The present invention relates generally to automotive telematics, such as vehicle to vehicle communication, vehicle to roadside communication, and vehicle to infrastructure communication. In particular, the invention concerns the latency experienced by all the existing data flows in a vehicle network.

BACKGROUND OF THE INVENTION

Vehicular communications have long been considered to be an enabler for numerous safety and commercial applications. Many automobile manufacturers are in different stages of integrating communication devices in their vehicles for a variety of purposes including safety, assisted driving, entertainment, and commerce. As an increasing number of vehicles start getting equipped with communication capability, large scale ad hoc networks can be envisioned in the near future. Numerous projects worldwide, e.g. in Europe, in the U.S., and in Japan, involve researching and developing the infrastructure for vehicular communications and automotive telematics. Studies have highlighted that the benefits of setting up vehicular networks significantly outweigh the initial setup costs.

Through a vehicular ad hoc network, it would be possible to forward queries from places without internet connectivity to faraway hot spots at a fraction of the cost of current infrastructure, e.g. 3G based communications. This can be accomplished because of the multi-hop data dissemination capability of vehicular networks, which is one of the major advantages of such networks. Multi-hop dissemination can be used for sending safety and emergency warning messages, exchanging neighborhood information queries, relaying data from the internet, etc. Accordingly, multi-hop data flows in a vehicular network could result from a range of applications.

At the same time, multi-hop data delivery through vehicular networks is complicated because of the high mobility and the partitioned nature of the networks. For example, vehicle mobility can have a significant influence on message delivery latency. The existing methods address the setting under the assumption that the density of vehicles equipped with communication radios is sufficiently high so as to have a significant impact. In reality, owing to the life cycle of automobile manufacturing, high density is unlikely. Further, assumptions about the deployment of roadside units typically serve to mitigate the concern about sparse environments. However, the cost associated with the deployment of roadside units may be prohibitive and in many areas vehicular ad hoc networks might be the only option. Moreover, owing to the time-scale of auto manufacturing, it is expected that the fraction of automobiles on the roads equipped with communication radios will be fairly low to begin with and catch up gradually. Due to the low equipped vehicle density, a store and forward method, where vehicles buffer packets and transmit them when another vehicle is in range, has often been the primary data relaying strategy.

Methods have been proposed for routing strategies in urban networks. For example, packets are forwarded to the intersections as quickly as possible. At the intersection, the packets use a geographical forwarding or a right hand rule. There is no consideration of other parameters, such as vehicle density, vehicle speeds, etc., in these strategies.

However, because of the unpredictable nature of vehicular networks, any data dissemination strategy needs to take into account a diverse range of environmental parameters such as vehicle speeds, direction, density radio range, roadway lengths etc. As a result of the high variability of the parameters, it is difficult for heuristic based forwarding methods to function well under the entire range of network conditions.

BRIEF SUMMARY OF THE INVENTION

The present invention advantageously provides a method for minimizing end-to-end latency that can be distributed and implemented independently on each vehicle. The inventive distributed protocol requires using a framework for optimization in the context of vehicular networks. The vehicles make local estimates of a few parameters and decide the direction in which to forward the data traffic. The selection of parameters used and the design of the local process is such that in doing so, the end-to-end delay of all the data traffic in the network is minimized. Moreover, the delay remains at the minimum in the face of the dynamic nature of the environment.

The inventive system and method for minimum delay data delivery in a multi-hop vehicular network with multiple vehicles and intersections comprises, at each source vehicle, initiating packet flow, labeling packets with destination coordinates and a current location, and forwarding the packet flow, and at each intersection, selecting a header vehicle, computing a backlog indicator and listening for broadcasts with a matrix and delay information, initializing or updating the matrix in accordance with the backlog indicator, forwarding the packet flow, and broadcasting the matrix from the header vehicle. In one embodiment, selection of the header vehicle is performed based on random countdown and vehicle ID. In one embodiment, the matrix includes the backlog indicator and a forwarding component. In one embodiment, the header vehicle broadcasts when it leaves the intersection and periodically thereafter. The method converges to the optimal (lowest latency) state irrespective of the initial starting point of the network and continues to tend towards the optimal state even as the network conditions alter.

The advantages of the proposed approach over existing works lie in its ability to (1) minimize the end-to-end delay of all flows; (2) employ very simple computation at each entity; and (3) tend to best performance point despite the dynamic nature of the parameters.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

The present invention advantageously provides a distributed method for minimum delay multi-hop data delivery in a vehicle network. In such vehicle networks, lack of vehicles or low equipped density results in end-to-end delays that are of the scale of vehicle mobility.

For example, Vehicle-Assisted Data Delivery (VADD) is a method of data deliver in Vehicular Ad Hoc Networks. This method assumes source destination in a connected graph, requires centralized computation to evaluate roadways with least delays, and may not achieve actual minimum delay due to error in delay approximation and lag. By contrast, according to the inventive method, no assumption regarding source destination is required. Most often, the source destinations are not connected. The inventive method does not require any centralized computation, unlike VADD. In addition, the inventive method implicitly minimizes delay by design.

Another method, Greedy Perimeter Stateless Routing (GPCR), uses heuristic-based forwarding so that, as network size or number of intersections grow, performance suffers. By contrast, as discussed above, in the inventive method, delay is minimized implicitly by design, and optimal performance can be obtained across different network sizes.

Figure 1A:
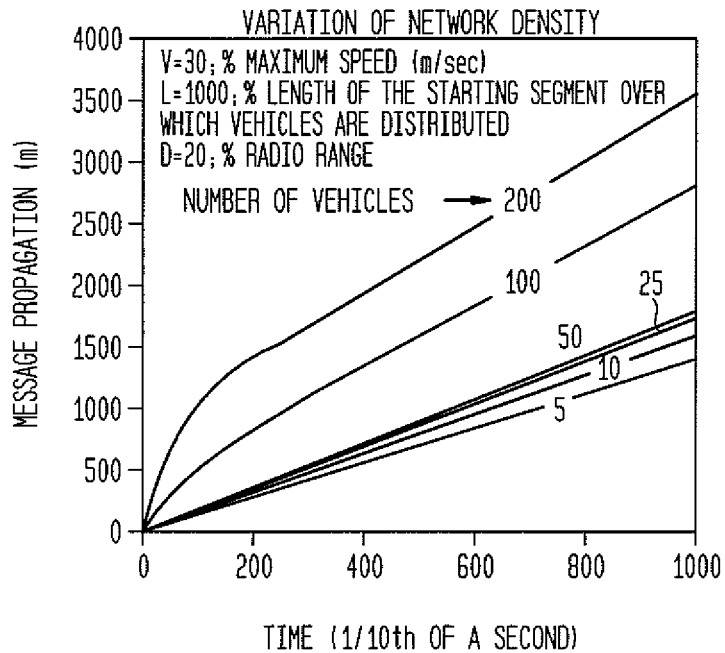
FIGS. 1(a) and 1(b) show message propagation under a store and forward strategy.
Figure 1B:
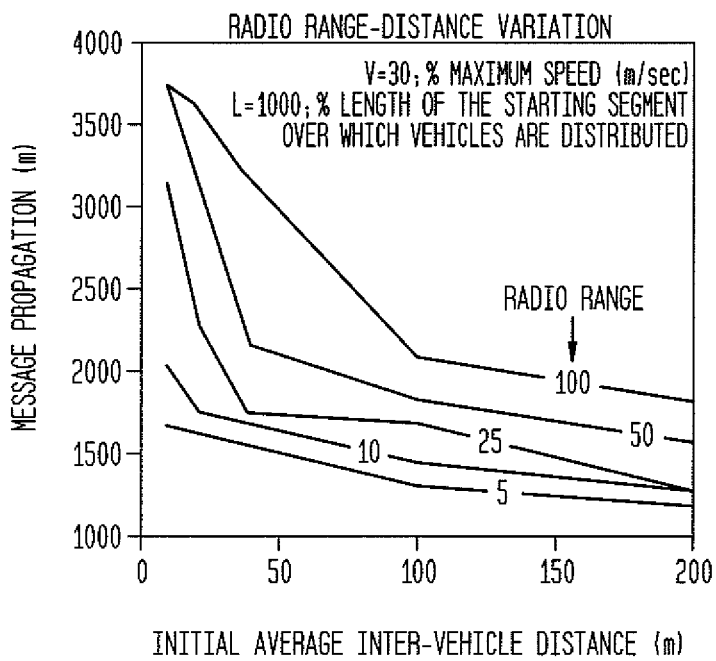

Vehicle networks have been considered as delay tolerant networks. The delay is dependent on the equipped vehicle density, radio range, vehicle speeds, etc. The spatial propagation of information under such situations has been extensively studied. For example, FIG. 1 gives a quick highlight of message propagation under a store and forward strategy. The distance traversed by a message with time for different vehicle densities and radio ranges is of interest. The vehicles move at a constant speed and the message is randomly generated. FIG. 1(a) shows that as the number of vehicles increases, the message travels significantly farther. FIG. 1(b) illustrates varying the average inter-vehicle distance; note that the distance propagated quickly reduces as the vehicle density declines even for high radio ranges. When the inter-vehicle distance is low, i.e., the vehicle density is high, wireless transmission is primarily used to transfer the packet. As the vehicle density decreases, packet forwarding switches to a carry and forward mode. This accounts for the changing slope of the curves in FIG. 1(b), as the inter-vehicle distance increases and the vehicle density decreases.

Figure 2A:
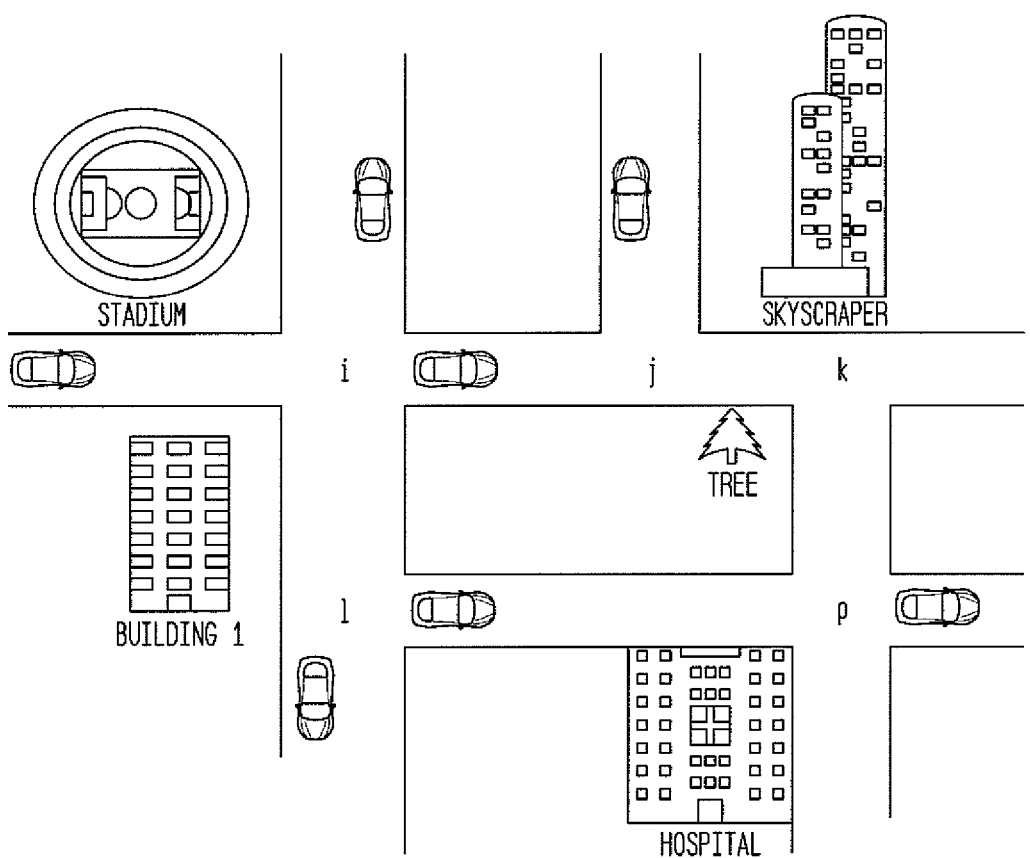
FIGS. 2(a) and 2(b) show the road network with the intersections as nodes and the roadways as edges.
Figure 2B:
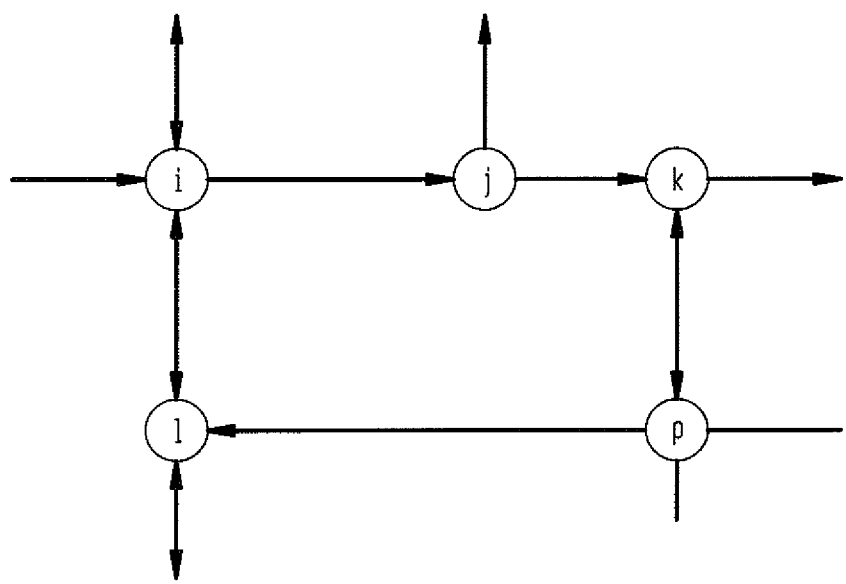

The delay model used to estimate the delay experienced on a particular roadway is now described. The road network as shown in FIG. 2(a) is modeled as a graph with the intersection as nodes and the roadways as edges as shown in FIG. 2(b). The intersections are indexed by i and j and ij denotes the road between i and j.

For each roadway ij, we define certain parameters. Let:

$d_{ij}$ denote the delay experienced on roadway ij $l_{ij}$ denote the physical length of road way ij $v_{ij}$ denote the average vehicle speed on segment ij $\rho_{ij}$ denote the vehicle density on segment ij Note that all the above parameters except $l_{ij}$ are time varying.

The delay $d_{ij}$ on a roadway is modeled as:

$$d_{ij} = \begin{cases} \alpha l_{ij} & \text{if } 1/\rho_{ij} \leq R, \\ \dfrac{l_{ij}}{v_{ij}} - \beta\rho_{ij} & \text{if } 1/\rho_{ij} > R. \end{cases}$$

Here, $\alpha$, $\beta$ are constants and R is the radio range. For high vehicle densities that is, when the inter-vehicle distances are less than the radio range (R), the message gets forwarded via wireless propagation. The delay is then dependent on the roadway length. On the other hand, when the inter-vehicle distances are more than the radio range, the messages are propagated via a store and forward strategy. Even in this case, wireless transmission occurs which results in a reduction in delay ($\beta\rho_{ij}$).

Figure 3:
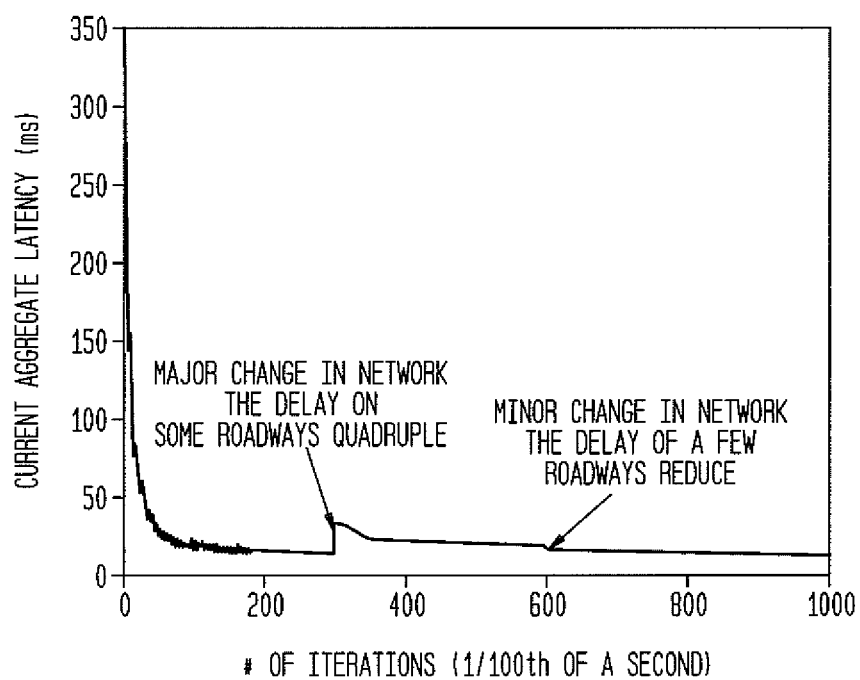
FIG. 3 illustrates convergence of the inventive process.

A mechanism for minimizing end-to-end latency in a vehicular network is presented below. The method is distributed and requires knowledge of only local parameters. The process converges to the optimal (lowest latency) state irrespective of the initial starting point of the network and continues to tend towards the optimal state even as the network conditions alter. An example of the convergence of the process is shown in FIG. 3, which illustrates the aggregate delay experienced by the data traffic on the roadways. The network converges to the optimal point and thereafter, for every other change in the network, the data traffic is reallocated to again converge to the lowest delay.

The above delay model can be evaluated using neighborhood information. This model captures the essentials of a carry and forward strategy and can be extended in several ways. Although detailed estimation procedure and analysis of the delay model is outside the scope of this work, an inventive framework for message forwarding that minimizes the estimated end-to-end delay is provided. While a representative method is presented, a variety of different ways of estimating the delay can be used within the scope of this invention.

A vehicular network can have multiple data sessions each with different sources and destinations. Depending on the current delay conditions on each roadway, each data flow r will experience a certain end-to-end delay. The total delay will be the sum of delays experienced on each roadway the message traverses. Local heuristics for forwarding cannot capture the conditions about the state of the roadways down the line and often lead to poor decisions especially in the case when the size of the roadway system increases or when the message has to traverse multiple intersections. Moreover, usage of shortest path processes to minimize the total weight will fail since many roadways do not have forwarding vehicles. Moreover, the delay on each roadway can change rapidly with time resulting in incorrect path computation.

For addressing these issues, in the present invention the forwarding direction is dynamically computed from neighborhood information using a distributed technique. The end-to-end delay observed by all the data flows in the network is accordingly minimized.

An inventive formulation that models the end-to-end data dissemination delay in the network is developed as follows. Let there be r flows each with a source intersection and a destination. A function $f_k$ is defined as 1 if intersection k is an originator of flow and 0 otherwise. Similarly, a function $g_k$ is defined as 1 if intersection k is a destination of flow and 0 otherwise. A flow r might or might not use road ij in which case $x_{ij}$ is 1 or 0 respectively. The cumulative delay of all the flows is the summation of the flows r with a summation of the delay $d_{ij}$ and $x_{ij}$ ($d_{ij}x_{ij}$), which can be minimized. An objective of interest could also be to minimize the maximum delay or to ensure fair delays. Given the vehicles on the road, each road segment ij could have a time varying capacity.

Various fairness and priority considerations can be incorporated into the model and are within the scope of the invention. The base case is presented herein for simplicity of exposition. The centralized version of the problem can then be compactly stated as:

$$P: \min \sum_r \sum_{(i,j)} d_{ij} x_{ij}^r$$

$$\text{s.t.} \sum_{j \in V} x_{kj}^r + g_k^r = \sum_{j \in V} x_{jk}^r + f_k^r \, \forall \, r \, \forall \, k.$$

$$x_{ij} \in \{0, 1\}$$

This formulation only captures a snapshot of the network wide optimization and is similar to a minimum weight paths. In a real system, the trivial method of computing shortest path will fail owing to the dynamic nature of the delay experienced on a particular link ij and the initiation and termination of flows. The delays change with time and may be very large if vehicles do not exist on a path. Moreover, messages might not even be sent on a computed path due to non-availability of a vehicle. In such a case an alternate path is to be used.

A distributed process that minimizes end-to-end delay, along with a protocol to implement the process, can be developed. Note that the optimization involves integer variables. By inspection, the following special properties are seen.

All weight and cost values (via scaling) are integral.
Every variable is present in exactly two constraints.
Every coefficient in the constraints is 1 or −1.

Accordingly, a matrix A of the form Ax≤b is totally unimodular, that is the determinant of every square submatrix of A is 1, 0, or −1. Hence, the distributed iterative process that minimizes end-to-end delay converges to the optimal solution, irrespective of the initial choice of the iterates. In other words, the process can be started from any initial point. In particular, if an optimal solution is computed, and then the parameters of the problem change, the new optimum solution can be found starting from the prior optimal solution. In many cases, this speeds up convergence significantly.

The process can be shown as follows. A tri-level backlog indicator $\epsilon$ has a value of 1, 0, or −1 for each intersection k of each flow r. A matrix $x_{ij}$ can be computed such that each entry of the matrix is a tuple. The first component of each tuple, a forwarding component, determines whether or not to forward a flow on to a particular roadway. The second component is the tri-level backlog indicator C received from the neighboring intersection and is 0 by default. Let $\gamma$ be a constant and $\{\delta_n\}$ be a sequence of real numbers (step-sizes) that satisfy $\lim_{n \to \infty} \delta_n = 0$ and $\Sigma_{n=1}^{\infty} \delta_n = \infty$. For example $\delta_n = 1/n$ satisfies the condition.

Intersection k computes the indicator (8)

$$\epsilon_n^{r,k} = \begin{cases} 1 & \text{if } \sum_{j \in V} x_{kj}^r + g_k^r > \sum_{j \in V} x_{jk}^r + f_k^r, \\ 0 & \text{if } \sum_{j \in V} x_{kj}^r + g_k^r = \sum_{j \in V} x_{jk}^r + f_k^r \\ -1 & \text{if } \sum_{j \in V} x_{kj}^r + g_k^r < \sum_{j \in V} x_{jk}^r + f_k^r. \end{cases}$$

Intersection k updates $$x_{kj}^{n+1,r} = [x_{kj}^{n,r} - \delta_n(\gamma(\epsilon_n^{r,k} - \epsilon_n^{r,j}) + d_{kj})]_+.$$

The information maintained at Intersection Vehicles includes the matrix $x_{ij}$ as shown below.

| $X_{ij}$ r | 1 | 2 | 3 | Delay (ms) |
|---|---|---|---|---|
| A | (0, −1) | (0, 1) | (0, 0) | 4000 |
| B | (1, 0) | (0, 0) | (0, 1) | 8 |
| C | (0, 0) | (1, −1) | (0, 0) | 25 |
| D | (0, 1) | (0, 0) | (1, 0) | 15 |

Figure 4:
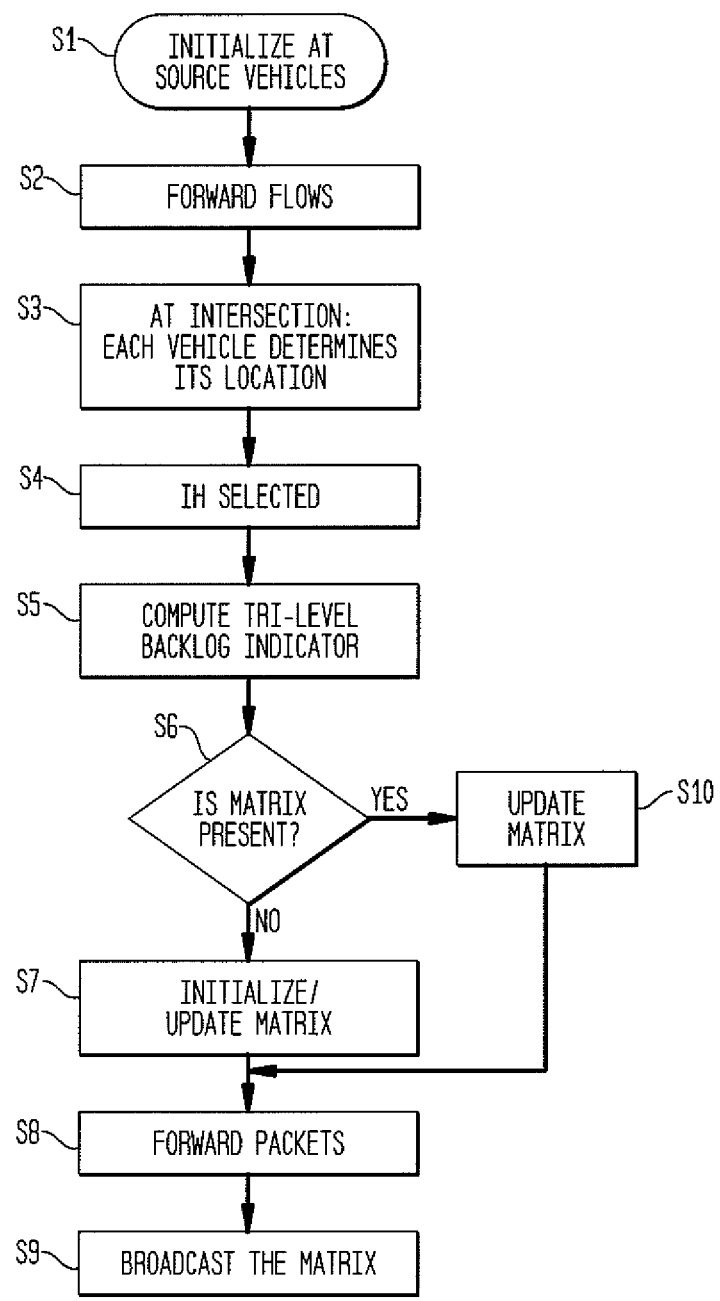
FIG. 4 is a flow diagram of the inventive method.

FIG. 4 is a flow diagram of the inventive process. At source vehicles, in step S1, the flows are initialized and packets are labeled with destination intersection coordinates and current location. In step S2, the traffic or flows are forwarded or sent. At intersection vehicles, multiple, distributed tasks are performed. Each vehicle at the intersection obtains its location, in step S3, through onboard maps and GPS information. Other methods of determining a vehicle location can also be used. In step S4, a vehicle is selected as Intersection Header (IH); this selection can be done based on a random countdown time and vehicle ID. In step S5, IH vehicles compute backlog indicators $\epsilon$ and listen for broadcasts with matrix and delay information. If a broadcast is not received in step S6 (S6=NO), the matrix is updated and the delay is estimated in step S7. However, if the matrix did not exist, it is initialized in step S7. The packets for each flow are forwarded in step S8, according to the matrix. Each IH vehicle leaving the intersection broadcasts the matrix at periodic intervals until IH arrives at the next intersection, in step S9.

If the broadcast is received (S6=YES), the received information is used to update the matrix in step S10. Updating the intersection k in the matrix $x_{ij}$ is shown above. The process then continues with step S8 above.

The inventive method leads to minimum end-to-end latency and operates under a wide range of conditions, such as varying vehicle speeds, densities, radio range, etc. The process incrementally adapts to changes in the vehicle traffic and data flow patterns. In addition, the process can be used to leverage existing roadside infrastructure.

The invention can be implemented as computer software or a computer readable program for operating on a computer. The computer program can be stored on computer readable medium. Various aspects of the present disclosure may be embodied as a program, software, or computer instructions embodied in a computer or machine usable or readable medium, which causes the computer or machine to perform the steps of the method when executed on the computer, processor, and/or machine. The computer can be a computer integrated with the vehicle or a computer carried into the vehicle for the purpose of data dissemination or exchange with and/or to other vehicles.

System and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

While the present invention has been described in particular embodiments, it should be appreciated that the present invention should not be construed as limited by such embodiments, but rather construed according to the below claims.

What is claimed is:

1. A method comprising:
    receiving a packet flow from a source vehicle at a header vehicle, wherein the packet flow includes packets that are labeled with destination coordinates and a location of the source vehicle;
    computing a backlog indicator at the header vehicle at an intersection, wherein the backlog indicator represents an amount of packet flow backlog at the intersection;
    updating network information regarding the intersection with the backlog indicator;
    forwarding the packet flow based at least in part on the network information; and
    broadcasting the network information from the header vehicle.

2. The method according to claim 1, further comprising selecting the header vehicle based on a random countdown and a vehicle identifier (ID).

3. The method according to claim 1, wherein the packet flow is received at the intersection, and wherein the broadcasting is performed after the header vehicle leaves the intersection.

4. The method according to claim 1, wherein the network information includes the backlog indicator and a forwarding component.

5. A non-transitory computer-readable medium having computer-instructions stored thereon, the instructions comprising:
    instructions to receive, at a header vehicle, a packet flow, wherein the packet flow includes packets that are labeled with destination coordinates and a location of a source vehicle;
    instructions to compute a backlog indicator at an intersection, wherein the backlog indicator represents an amount of packet flow backlog at the intersection;
    instructions to update network information regarding the intersection with the backlog indicator;
    instructions to forward the packet flow based at least in part on the network information; and
    instructions to broadcast the network information from the header vehicle.

6. The non-transitory computer-readable medium according to claim 5, further comprising instructions to select the header vehicle based on a random countdown and a vehicle identifier (ID).

7. The non-transitory computer-readable medium according to claim 5, wherein the packet flow is received at the intersection, and wherein the broadcast is performed after the header vehicle leaves the intersection.

8. The non-transitory computer-readable medium according to claim 5, wherein the network information includes the backlog indicator and a forwarding component.

9. The non-transitory computer-readable medium of claim 5, further comprising instructions to listen for a broadcast that includes the network information.

10. The non-transitory computer-readable medium of claim 5, further comprising instructions to listen for a broadcast that includes delay information.

11. The non-transitory computer-readable medium of claim 5, further comprising instructions to determine whether the network information is present.

12. The non-transitory computer-readable medium of claim 11, further comprising instructions to initialize a matrix that includes the network information if the network information is not present.

13. The method of claim 1, further comprising listening for a broadcast that includes the network information.

14. The method of claim 1, further comprising listening for a broadcast that includes delay information.

15. The method of claim 1, further comprising determining whether the network information is present.

16. The method of claim 15, further comprising initializing a matrix in accordance with the backlog indicator if the network information is not present.

17. A system comprising:
    a memory configured to store a packet flow that is received from a source vehicle, wherein the packet flow includes packets that are labeled with destination coordinates and a location of the source vehicle; and
    a processor operatively coupled to the memory and configured to:
        compute a backlog indicator at an intersection, wherein the backlog indicator represents an amount of packet flow backlog at the intersection;
        update network information regarding the intersection with the backlog indicator;
        forward the packet flow based at least in part on the network information; and
        broadcast the network information.

18. The system of claim 17, wherein the packet flow is received at the intersection, and wherein the broadcast is performed after a header vehicle that includes the system leaves the intersection.

19. The system of claim 17, wherein the network information includes the backlog indicator and a forwarding component.

20. The system of claim 17, wherein the processor is further configured to:
    determine whether the network is present; and
    initialize a matrix in accordance with the backlog indicator if the network information is not present.

* * * * *